Oct. 21, 1969  R. W. WILDS ET AL  3,473,197

LOCKED MOLD ASSEMBLY

Filed May 6, 1968  3 Sheets-Sheet 1

INVENTORS
ROBERT W. WILDS
ROBERT E. MEYER
BY
Woodard, Weikart, Emhardt & Naughton
Attorneys

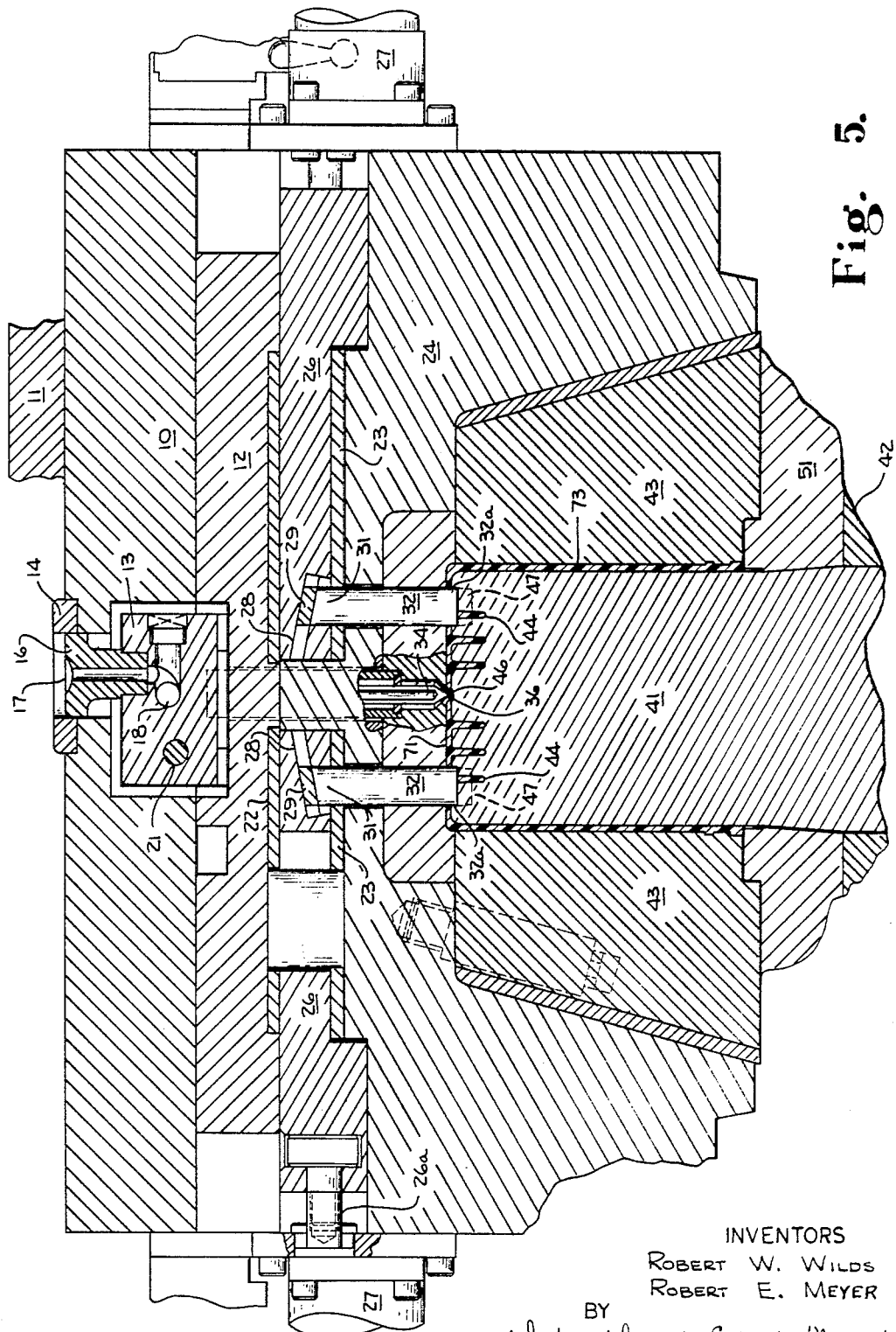

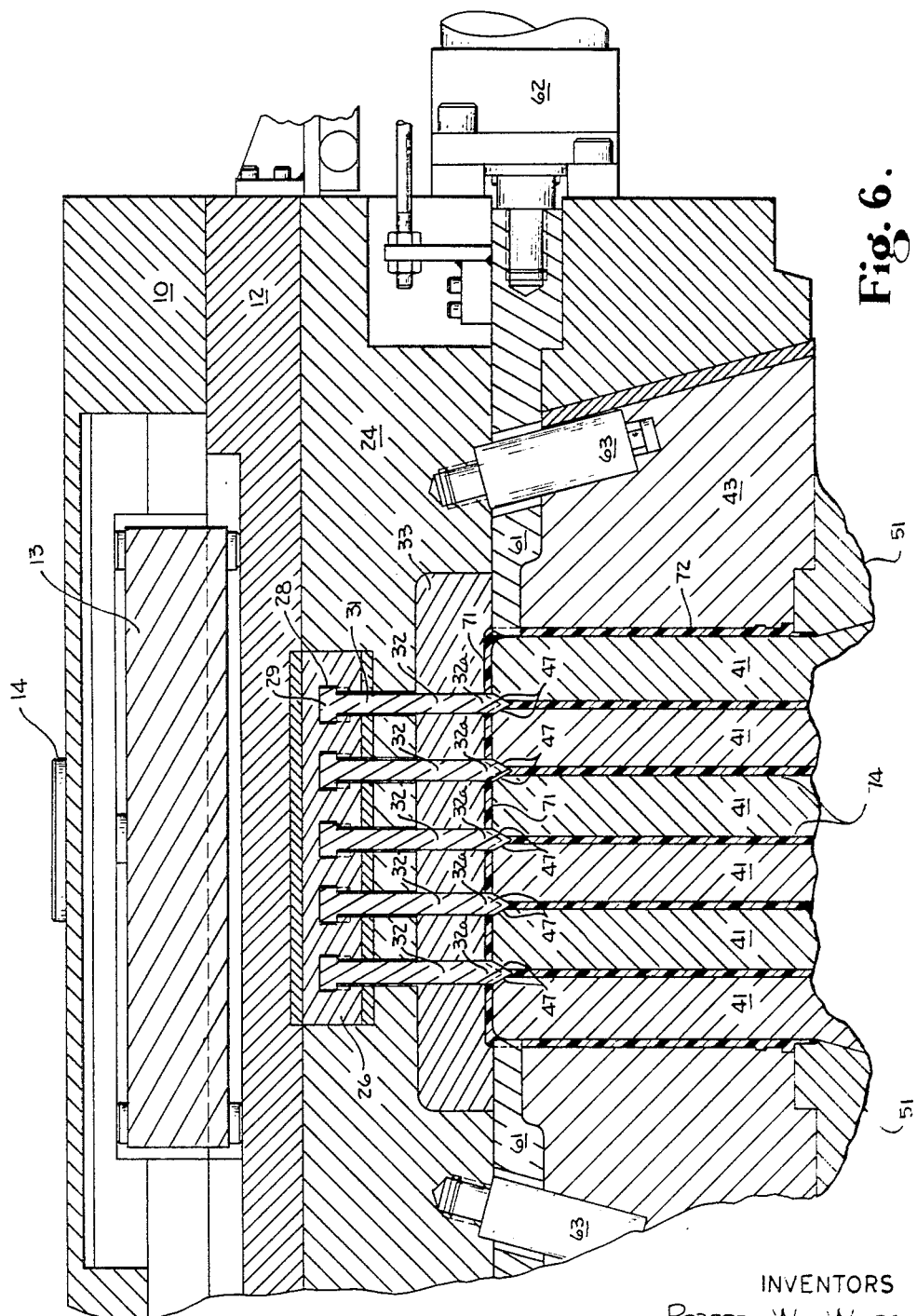

United States Patent Office 3,473,197
Patented Oct. 21, 1969

3,473,197
LOCKED MOLD ASSEMBLY
Robert W. Wilds and Robert E. Meyer, Indianapolis, Ind., assignors to E. W. Mold & Tool Co., Inc., Indianapolis, Ind., a corporation of Indiana
Filed May 6, 1968, Ser. No. 726,874
Int. Cl. B29c 1/06; B29f 1/022
U.S. Cl. 18—42                             7 Claims

ABSTRACT OF THE DISCLOSURE

A mold assembly in which cantilever mounted cores are held tightly in compression at their free ends during a portion of the molding cycle by reciprocable wedge members which engage the cores at their ends and side surfaces and lock them against displacement.

BACKGROUND OF THE INVENTION

In the injection molding of articles such as thin-walled, multi-partitioned containers (for example, automotive storage battery cases with multiple cell partitions), the mold assemblies utilize relatively lengthy, cantilever mounted cores which extend into a cavity member. Although the cores are mounted rigidly at their base and are customarily fabricated of steel, because of thermal stresses and momentary unbalanced application of hydrostatic forces by the liquid molding material, the cores invariably tend to shift or be displaced slightly and, in the molding of articles such as electrical storage battery cases, this results in uneven cell wall thickness and an unsatisfactory product. Merely bracing the free ends of the cores results, inherently, in apertures appearing in the molded part at the area of contact between the braces and the cores. Further, analysis of the problem has shown that a satisfactory solution to the problem requires bracing of the complete core array in two transverse planes so as to place the entire array of cores under compression, rather than a mere holding of the core ends.

SUMMARY

The concept of the present invention envisages the placement of reciprocable wedge members at the free ends and adjacent sides of the cores in the mold assembly, those members at the core side surfaces being referred to as side locking members, with at least some of the members extending between the cores to provide a wedging action. The members are withdrawn out of contact with the cores as the molding cycle proceeds to prevent the formation of openings at the areas of engagement of the cores and reciprocable members. The rigid locking of the cores against deflection results in a product of uniform wall thickness and of excellent quality even though the design of the molded article incorporates intricate, thin-walled partitions.

BRIEF DESCRIPTION OF THE DRAWINGS

FIG. 5 is a sectional view of the mold assembly of the present invention taken generally along the line 5—5 of FIG. 2 but showing the array of cores inserted in the cavity.

FIG. 6 is a sectional view of the mold assembly of the present invention taken generally along the line 6—6 of FIG. 1 but showing the array of cores inserted in the cavity.

BRIEF DESCRIPTION OF THE PREFERRED EMBODIMENT

The mold assembly herein described is of the injection molding type in which the two halves of mold assembly are fastened in place to the stationary and movable die plates or press platens of a conventional injection molding machine (not shown).

Figure 1:
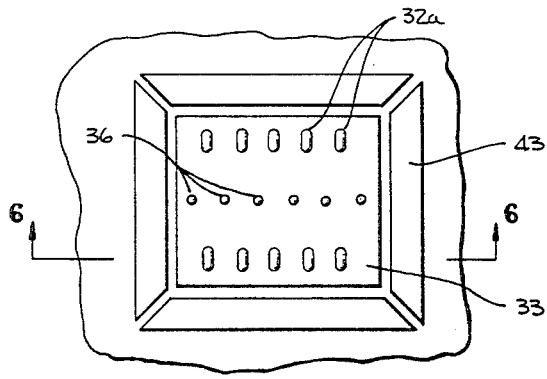
FIG. 1 is a fragmentary front view of the cavity member portion of the mold assembly embodying the present invention.

Referring initially to FIGS. 1 and 6, the cavity member portion of the mold includes the cavity clamping plate 10 (FIG. 5) which, when in place in an injection molding press, is engaged by the press platen, indicated fragmentarily at 11. Underlying the clamping plate 10 is the cavity back-up block 12 and the block 12 and plate 10 jointly accommodate the hot runner bar 13 which, as may be seen in FIG. 5, is rectangular in cross section. A counterbored aperture in the plate 10 accommodates the locating ring 14 and the sprue bushing 16. The sprue bushing 16 is provided with an indentation 17 into which the press nozzle seats. A central passage through the sprue bushing 16 serves to transmit hot molding material from the injection nozzle into an elongated passage 18 which acts as a runner for a series of secondary sprues, one of which is shown in FIG. 5 and identified at 19. The runner bar 13 may be provided, as is conventional, with a heater extending through the bar and identified at 21.

The cavity back-up block 12 is provided with an insert plate 22 and a similar insert plate 23 is secured to a cavity retainer block 24 which is beneath and spaced from the block 12 as viewed in FIG. 5. Extending between the inserts 22 and 23, on opposite sides of the row of secondary sprues 19 are wedge driver cams 26. The driver cams 26 may be actuated to move horizontally by any suitable means but are here shown to be actuated at their outer ends 26a by an actuating element taking the form of the hydraulic cylinders 27.

At their inner ends the driver cams 26 have inclined T-shaped slots 28 formed therein. The slots 28 accommodate the head 29 and shank portion of 31 of an aligned row of wedge members 32, the two rows of wedge members being located on opposite sides of the row of secondary sprues 19. The cooperation of the heads 29 of the wedge members 32 with the inclined surface of the T-slots 28 is such that when the driver cams 26 are moved to their extreme inward position, as viewed in FIG. 5, the members 32 will be in their extreme downward or extended position and when the driver cams 26 are moved downwardly the edge members will be moved upwardly or retracted by this outward motion of the cams 26. The cams 26 and the form of their connection to the wedge members 32 acts as a means for transforming the horizontal motion of the actuating members 27 into the vertical motion of the wedge members 32. Other forms of motion transmission might be utilized, however, the inclined T-slot and interfitting wedge heads fulfill the required function quite satisfactorily.

The wedge members 32 extend freely through apertures in the cavity retainer block 24 and through apertures in the bottom cavity insert 33. The bottom cavity insert 33 also carries an aligned row of apertures forming the secondary sprues 19 which receive molding material from the runner 18. As is conventional, the secondary sprues 19 carry a heater element identified at 34. While only one of the secondary sprues is visible in FIG. 5 the slight convex formation and the apertures in which the sprues terminate can be seen in FIG. 1, the terminating apertures for the sprues being identified at 36.

When the mold assembly is completed, the cavity structure, in general, so far described receives an array of parallel cores 41. As here illustrated the cores 41 (FIG. 2) are six in number and are mounted, cantilever fashion at their base, in the core retainer plate shown fragmentarily at 42 in FIG. 5. When the mold is assembled, the cores 41 extend into the opening bounded by the cavity side cams 43 (FIG. 5) and into spaced, but close proximity to the cavity insert 33. In assembling the mold, it will be understood that the protruding core array shown in FIG. 2 fits within the opening bounded by the cavity side cams 43 of FIG. 1 to provide the structure shown in FIGS. 5 and 6. The end surfaces of the cores are provided with aligned, transferse slots 44 which extend to a depth indicated in FIG. 5 to provide reinforcing ribs at the base of the molded article. The slight concavity centrally within each of the cores, and identified at 46 in FIG. 5, accommodates the adjacent convex surface of the secondary sprue area, as visible in FIG. 2, and it will be understood that when the cores are in assembled relation with respect to the bottom cavity insert 33, the concavities 46 will register with the convex surfaces 36 of the insert 33 (FIG 1).

Figure 2:
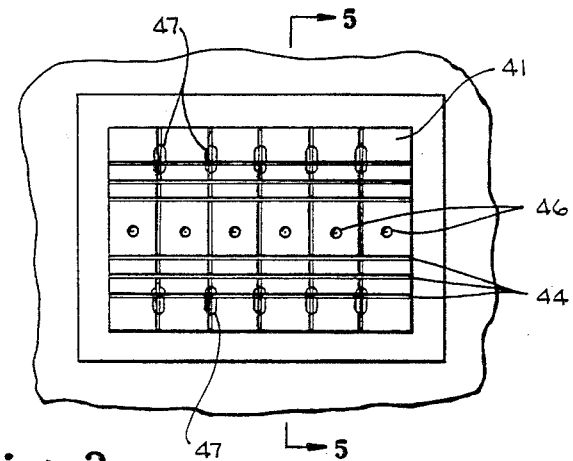
FIG. 2 is a perspective view of the core array, adapted to fit within the cavity member of FIG. 1, together with a portion of the core retainer plate.

As may best be seen in FIGS. 2 and 6, adjacent end areas of each of the cores, are undercut to provide generally wedge or V-shaped slots 47, the slots being visible in cross section in FIG. 6. It will be noted that the wedge-shaped openings thus provided extend along the adjacent surfaces of adjoining cores. These slots are adapted to accommodate the wedge or V-shaped ends 32a of the wedging members 32. In FIG. 5, the wedge members 32 are shown in their extended position, that is, their position in which they extend into the apertures 47 and tightly engage the cores. When the driver cams 26 are moved rightwardly, the resulting motion imparted to the members 32 withdraws the end portions 32a from the cores and into the positions illustrated in broken lines in FIG. 6. A stripper plate 51 (FIG. 5) extends into proximity with the cores and engages the cavity side cams 43 when the mold is closed. The stripper plate performs its conventional function in the stripper plate ejection conventionally used where thin-wall sections are present in the molded part, the stripper plate moving when the mold has been opened after the molding process to remove the molded article from the cores as is conventional.

Referring to FIG. 6, means are provided to produce the sideward forces on the outer cores in the core array which, with the forces applied by the wedging members 32 lock the array of cores firmly in compression. This means includes the side locking members 61, one on each end of the array of cores. These side locking members are rigidly secured, at their outer ends, to the thrust pin of an actuating element taking the form of the hydraulic cylinder 62. Actuation of the cylinders 62 moves the locking member 61 horizontally, as viewed in FIG. 6, from an extended position in which the ends of the locking members are in engagement with the outer side surfaces of the outer cores to a position in which they are withdrawn slightly from engagement with the core surface as indicated by broken lines in FIG. 6. It will be understood that both side locking members 61 are actuated by their individual hydraulic cylinders although only one is shown in FIG. 6. The locking members 61 are apertured with sufficient clearance to permit the reciprocal motion mentioned above without interfering with the locator pins 63.

At the start of the molding operation the wedge members 32 and the side locking members 61 are in their solid line positions of FIG. 6 tightly locking the ends of the cores 41. Typically, a polyolefin molding material such as polypropylene is injected, by the molding machine, through the secondary sprues and the apertures 36 into the space between the cores and the cavity. The hot liquid molding material flows into the spaces between the cores and around the outer core surfaces to assume the shape of the battery case illustrated in FIGS. 3 and 4. Study of the mechanics of the flow of the liquid molding material indicates that its rate of flow at various parts of the core-cavity interspace is quite irregular and is a "stuttering" type of flow thus producing the unbalanced, hydrostatic forces on the cores which, under prior art practice, cause them to deflect and result in uneven molded article wall thickness. The engagement of the core ends by the side locking members 61 and by the wedge members 32 tightly locks the cores in compression against such deflection. The wedge shape of the engaging ends of the members 32 provides both a verticle and a horizontal force component holding the cores in place and the engagement of the outer surface of the outer cores by the members 61 locks the array of cores in compression and solidly holds them.

Figure 4:
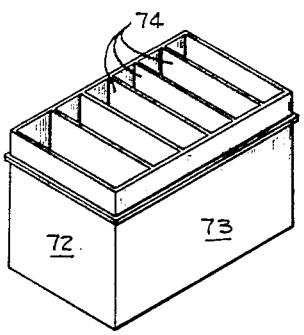
FIG. 4 is a perspective side view of the molded battery case of FIG. 3.
Figure 3:
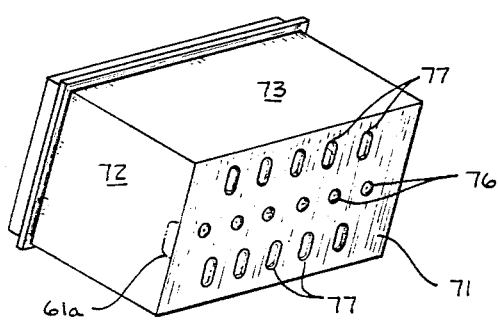
FIG. 3 is a perspective view, taken from the base, of a typical battery case molded in the mold assembly of the present invention.

As the molding cycle proceeds the liquid molding material fills the interspace between the cores and cavity providing the base 71, ends 72, sides 73 (FIG. 5) and partitions 74 in the molded container, these components also being identified in FIGS. 3 and 4. As the molding cycle proceeds, the wedge members 32 and the side locking members 61 are moved by their respective actuating elements into their broken line positions of FIG. 6 in which they are spaced from the core surfaces by an amount corresponding to the desired local wall thickness for the molded container. As the members 32 and 61 are withdrawn, molding material flows around them and closes the space at the core surfaces previously occupied by the withdrawn members. It will be understood that, should it be desired that core openings appear in the molded article at these areas, the elements could remain in place in their solid line positions. After molding is completed the mold assembly is opened by operation of the molding machinery and the molded container is ejected from the mold in conventional fashion.

As will be evident from FIG. 3, the side locking pins 61 engage the adjacent cores at an area centered in the marginal area of the adjacent outer side surface of the outermost cores, the area of engagement being identified at 61a in FIG. 3. The secondary sprues leave a row of slight concavities 76 in the base of the molded container and rows of wedge-shaped indentations 77 also appear in the base of the container identifying the area of entry of the wedge members 32.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

We claim:
1. In a mold assembly particularly adapted for the injection molding of thin-walled multi-partitioned containers requiring a relatively lengthy cantilever-mounted array of cores extending into the cavity member and having means adjacent the free ends of said cores for injecting plastic material into the space between the cavity member and the cores, wherein the improvement comprises parallel wedge members mounted on the cavity member for limited motion parallel to the direction of extension of said cores and when in one position extending between the adjacent free ends of said cores and engaging a portion of the adjacent side and end surfaces of the cores, side locking members mounted on the cavity member for limited motion transverse to the direction of extension of said cores and when in one position extending into engagement with a portion of the outer side surface of the outermost cores in the core array adjacent the free ends of the engaged cores, said wedge and locking members being spaced from said core surfaces when in a second position by an amount corresponding to the desired local wall thickness for the molded container, and actuating elements for moving said wedge and locking members between their said first and second positions at predetermined times during the injection molding cycle to stabilize the free ends of all of said cores by applying compressive stress thereto when said wedge and locking members are in their said first positions and to permit the flow of mold material around said members when in their said second positions.

2. A mold assembly as claimed in claim 1 in which the core engaging portions of said wedge members are V-shaped in cross-section and accommodating indentations of V-shaped cross-section are formed in the adjacent side and end surfaces of the cores whereby both longitudinal and transversely directed forces are applied to the cores by engagement of said wedge members therewith.

3. A mold assembly as claimed in claim 2 in which said side locking members are positioned to exert a force on said cores opposing the transversely directed forces applied by said wedge members when said locking members are in engagement with said cores.

4. A mold assembly as claimed in claim 3 in which the area of engagement of said side locking members and said cores when the side locking members are in their said first position is centered in the marginal area of the adjacent outer side surface of said outermost cores in the core array.

5. In a mold assembly particularly adapted for the injection molding of thin-walled multi-partitioned containers or the like requiring a relatively lengthy cantilever-mounted array of cores extending into the cavity member and having means adjacent the free ends of said cores for injecting plastic material into the space between the cavity member and the cores, wherein the improvement comprises wedge members mounted on the cavity member for limited motion parallel to the direction of extension of said cores and when in one position extending between the adjacent free ends of said cores and engaging a portion of the adjacent side and end surfaces of the cores, said wedge members being spaced from said core surfaces when in a second position by an amount corresponding to the desired local wall thickness for the molded container, and actuating means for moving said wedge members between their said first and second positions at predetermined times during the injection molding cycle to stabilize the free ends of all of said cores when said wedge members are in their said first positions and to permit the flow of mold material around said members when in their said second positions.

6. In a mold assembly particularly adapted for the injection molding of thin-walled multi-partitioned containers or the like requiring a relatively lengthy cantilever-mounted array of cores extending into the cavity member and having means adjacent the free ends of said cores for injecting plastic material into the space between the cavity member and the cores, wherein the improvement comprises wedge members mounted for limited motion parallel to the direction of extension of said cores and when in one position extending between the adjacent free ends of said cores and engaging a portion of the adjacent side and end surfaces of the cores, said wedge members being spaced from said core surfaces when in a second position by an amount corresponding to the desired local wall thickness for the molded container, and actuating means for moving said wedge members between their said first and second positions at predetermined times during the injection molding cycle to stabilize the free ends of all of said cores when said wedge members are in their said first positions and to permit the flow of mold material around said members when in their said second positions.

7. In a mold assembly particularly adapted for the injection molding of containers or the like requiring a relatively lengthy cantilever-mounted core extending into the cavity member and having means adjacent the free end of said core for injecting plastic material into the space between the cavity member and the core, wherein the improvement comprises locking members mounted for limited motion transverse to the direction of extension of said core and when in one position extending into engagement with the side surfaces of said core adjacent its free end, said locking members being spaced from said core surfaces when in a second position by an amount corresponding to the desired local wall thickness for the molded container, and actuating means for moving said locking members between their said first and second positions at predetermined times during the injection molding cycle to stabilize the free end of said core when said locking members are in their said first positions and to permit the flow of mold material around said members when in their said second positions.

References Cited

UNITED STATES PATENTS

| 1,445,624 | 2/1923 | Harris. |
| 1,589,913 | 6/1926 | Wells. |
| 1,918,532 | 7/1933 | Geyer _____ 18—195 |
| 2,301,338 | 11/1942 | Smith. |
| 2,361,348 | 10/1944 | Dickson et al. |
| 2,604,661 | 7/1952 | Karns. |
| 2,822,578 | 2/1958 | Lobell. |
| 3,051,994 | 9/1962 | Carozzo. |
| 3,060,509 | 10/1962 | McCubbins. |
| 3,120,572 | 2/1964 | Shannon _____ 264—261 |

FOREIGN PATENTS

| 962,726 | 12/1949 | France. |
| 599,570 | 3/1948 | Great Britain. |

J. HOWARD FLINT, JR., Primary Examiner

U.S. Cl. X.R.

18—45